United States Patent

Vollbrecht et al.

[11] Patent Number: 5,905,574
[45] Date of Patent: May 18, 1999

[54] METHOD AND APPARATUS FOR CANCELING CROSS POLARIZATION INTERFERENCE

[75] Inventors: Jennifer L. Vollbrecht, Hermosa Beach; Andrew L. Strodtbeck, El Segundo; Ronald W. Burch; Paul Y. Sako, both of Redondo Beach, all of Calif.

[73] Assignee: Hughes Electronics Corporation, El Segundo, Calif.

[21] Appl. No.: 09/167,074

[22] Filed: Oct. 6, 1998

[51] Int. Cl.$^6$ ........................................................ G01B 9/02
[52] U.S. Cl. .............................................. 356/345; 356/351
[58] Field of Search ........................................ 356/345, 351

[56] References Cited

U.S. PATENT DOCUMENTS 5,694,216  12/1997  Riza ........................................ 356/345
5,838,441  11/1998  Satorius et al. ......................... 356/351

*Primary Examiner*—Robert H. Kim
*Attorney, Agent, or Firm*—Georgann S. Grunebach; M. W. Sales

[57] ABSTRACT

A circuit for canceling cross polarization interference has a first signal input and a second signal input. An adjustable cancellation network circuit is coupled to the first input and the second input. The adjustable cancellation network circuit has a first programmable vector modulator having a first weight and a second programmable vector modulator having a second weight. The first weight is correlated to the first input signal to obtain a first output signal. The second weight is correlated with the second input signal to obtain a second output signal. A performance measurement circuit is coupled to the cancellation network circuit and receives the first output signal and the second output signal. The performance measurement circuit generates a first correlated signal corresponding to the amount of interference in the first correlated signal and a second correlated signal corresponding to the amount of interference in the second correlation signal. A controller is coupled to the cancellation network and performance measurement circuit. The controller receives the first correlated signal and the second correlated signal. The controller calculates an updated first weight and second weight in response to the first correlated signal and the second correlated signal.

20 Claims, 3 Drawing Sheets

METHOD AND APPARATUS FOR CANCELING CROSS POLARIZATION INTERFERENCE

This invention was made under Government support. The Government has certain rights in this invention.

TECHNICAL FIELD

The present invention relates generally to radio frequency (RF) communications. More specifically, the present invention relates to canceling interference in received RF signals.

BACKGROUND OF THE INVENTION

Adjacent transponders contained in satellites often use different polarizations. In many applications, vertical polarization is used on odd numbered transponders and horizontal polarization is used on even numbered transponders. Many satellites also use either right-hand or left-hand circular polarization for signal discrimination. By polarizing the signals of the satellite, the same frequencies may be reused. This is particularly important since signal traffic on satellites is increasing. One problem with reusing frequencies to increase the capacity of a satellite is that utilizing dual-polarization at K-band and higher frequencies is often plagued by attenuation and depolarization due to the transmission of the signals through rain or other atmospheric conditions.

One method for compensating for cross polarization is by increasing the effective isotropic radiated power (EIRP). By increasing the EIRP, the signal to noise ratio of the signal is increased. The approach would transmit higher EIRP on both channels. However, during a heavy rain event, the self interference caused by cross polarization becomes the limiting noise source. Increasing EIRP in one channel increases interference in the other channel. This solution has several drawbacks including high power consumption at both the receiving end and the transmitting end and that it work.

One method of canceling for cross polarization interference involves injecting pilot tones into one polarized wideband channel at the transmitter. The pilot tones are used to compute an estimate of the magnitude and phase of the interfering signal at the receiver. The phases and the amplitudes of the leakage tones are measured and used to compute the phase and amplitude at the mid-band point of the wide band channel. The computed quantity is then used to control a complex weighting circuit.

One problem with the pilot tone method for removing interference is that the method is only capable of removing average cross polarization interference across the transmitted bandwidth. The pilot tones are located at either side of the transmitted frequency band to avoid adding interference themselves. Thus, it is assumed that the dispersion is linear between the two pilot tones. Studies have shown, however, that cross polarization interference is frequency dependent and may vary widely across a frequency band. This can reduce the accuracy of the calculation.

The pilot tone method known for reducing cross polarization interference is only a "one-sided" device. That is, unless a second device is built and a second set of pilot tones is inserted into the primary channel, cancellation occurs only in the primary channel. The secondary channel, which is for the pilot tones, is used only to provide interference measurements to the primary channel. Thus, two independent devices are required and two sets of pilot tones must be injected, one in each channel Other possible techniques for cross polarization interference cancellation rely on techniques similar to base band equalization. Such systems require demodulation of the received signal. Because the systems require demodulation, the system is not flexible to changes in data rate, modulation format, and the number of carriers.

What is needed is a method for integrating a cross polarization interference canceller that is independent of waveform, data rate, and the number of carriers on the system. Further, such a method would not have any additional reference data needs, such as pilot tones.

SUMMARY OF THE INVENTION

It is thus a general object of the present invention to provide a reliable and adaptable cross polarization interference canceller that does not require reconfiguration if transmission parameters such as data rate, modulation format, or the number of carriers changes.

In one aspect of the invention, a circuit for canceling cross polarization interference comprises a first signal input and a second signal input. An adjustable cancellation network circuit is coupled to the first input and the second input. The adjustable cancellation network circuit has a first programmable vector modulator having a first weight and a second programmable vector modulator having a second weight. The first weight is correlated to the first input signal to obtain a first output signal. The second weight is correlated with the second input signal to obtain a second output signal. A performance measurement circuit is coupled to the cancellation network circuit and receives the first output signal and the second output signal. The performance measurement circuit generates a first correlated signal corresponding to the amount of interference in the first correlated signal and a second correlated signal corresponding to the amount of interference in the second correlation signal. A controller is coupled to the cancellation network and measurement network circuit. The controller receives the first correlated signal and the second correlated signal. The controller calculates an updated first weight and second weight for the cancellation network.

In a further aspect of the invention, a method for canceling for cross polarization between a first input signal and a second input signal comprises the steps of receiving a first input signal from a first channel and a second input signal from a second channel; and generating a first output signal by correlating the first input signal with a first weight and a second output signal by correlating the second input signal with a second weight. The method further includes the steps of generating a first limited signal from the first output signal and a second limited signal from the second output signal; generating a first correlated signal indicative of interference from the first input signal on the second signal from the first limited signal; and, generating a second correlated signal indicative of interference of the second input signal on the first signal from the second limited signal. The first weight and second weight are adaptively changed in response to the first correlated signal and the second correlated signal that correspond to an amount of cross polarization detected.

One advantage of the invention is that the circuit is transparent to both the transmit station and receive station. Thus, no modifications are required for either beyond the addition of the circuit to the receive station. Another advantage of the present invention is that no calibration of the unit is required. Yet another advantage of the invention is that the once installed circuit may be operated continuously through rain and all other types of weather.

Other features and advantages of the invention will become apparent from the following detailed description which will be read in conjunction with the drawings.

BEST MODE(S) FOR CARRYING OUT THE INVENTION

Figure 1:
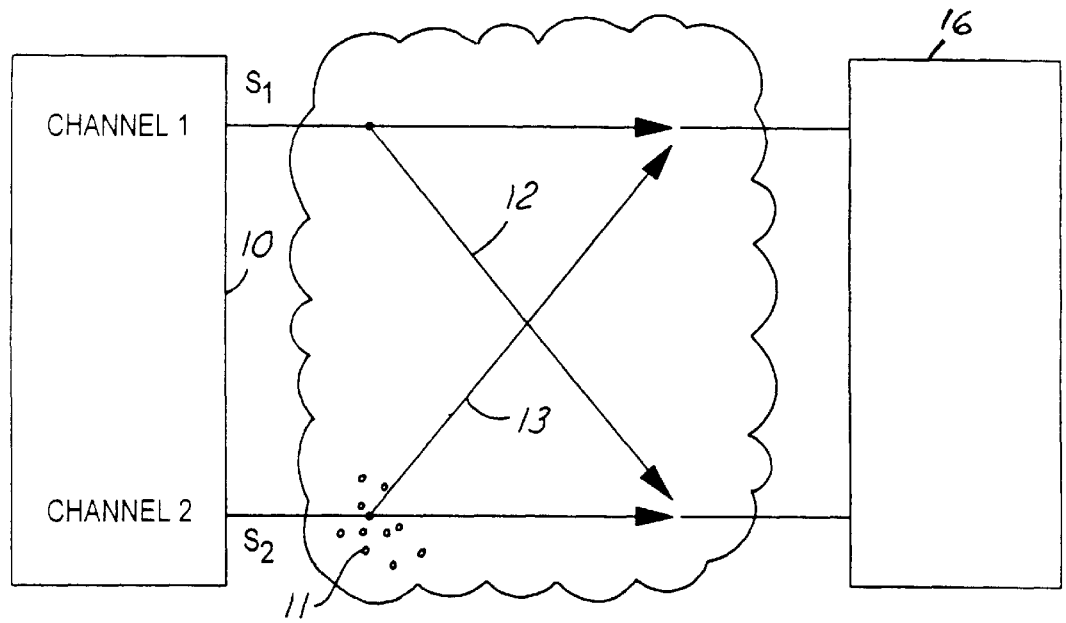
FIG. 1 is an elevational view representing two signals undergoing depolarization in rain.

Referring now to the drawings, the same reference numerals are used to identify the same components in the various views. Although the invention will be described and illustrated in terms of communication signals having circular polarization, the present invention also applies to linear polarization.

Referring now to FIG. 1, a simplified illustration of the depolarization process is illustrated. A transmitter 10 generates a first channel that has a signal $S_1$ and a second channel that has a signal $S_2$. Signals $S_1$ and $S_2$ are transmitted from a satellite and have different polarization. For example, signal $S_1$ may have left-hand circular polarization, i.e., generated by a lefthand circularly polarized source and signal $S_2$ may have right-hand circular polarization. Of course, signals $S_1$ and $S_2$ could be linearly polarized as well. As signals $S_1$ and $S_2$ enter rain 11 or other signal altering atmospheric conditions, interference causes a portion of signal $S_1$ to leak into the second channel and a portion of signal $S_2$ to leak into the first channel, as represented by arrows 12 and 13 respectively. Thus, the signals $S_1$ and $S_2$ transmitted by transmitter 10 that are received by a receiver 16 each have an interference factor added to the signal. The difficulty in removing interference from the signals arises because $S_1$ and $S_2$ are ever changing and atmospheric conditions are also constantly changing thus changing leakages 12 and 13.

Figure 2:
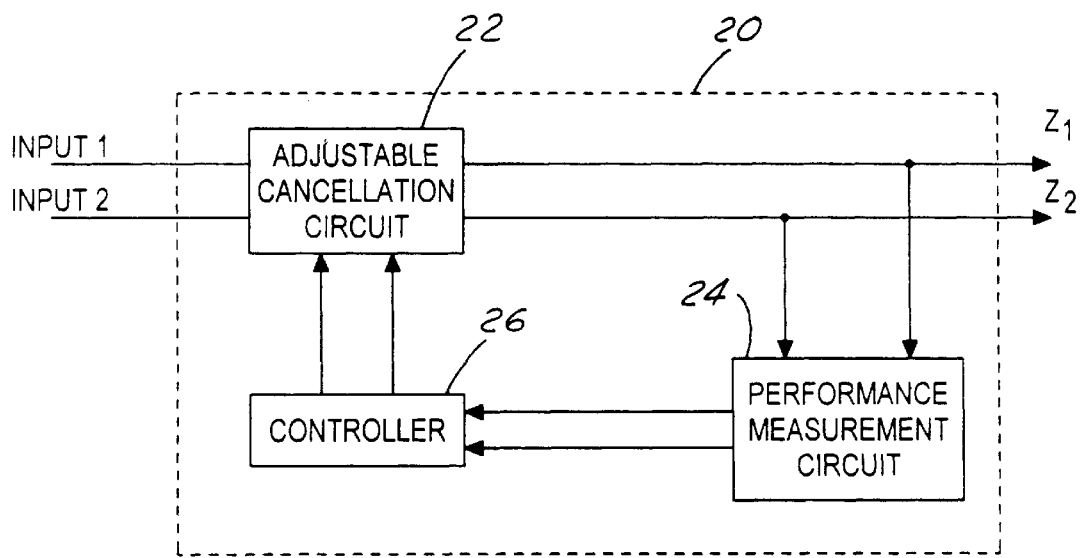
FIG. 2 is a high level block diagram of a cross polarization interference canceller according to the present invention.

Referring now to FIG. 2, a cross polarization interference canceller (CPIC) 20 has a first input, INPUT 1, and a second input, INPUT 2. CPIC 20 is preferably coupled before receiver 16 (as shown in FIG. 1) to remove interference from the first channel and the second channel, which are received at INPUT 1 and INPUT 2 respectively, before demodulation and further signal processing. In this manner, the demodulation format, data rate and number of carriers do not affect the signal. CPIC 20 has a first output $Z_1$ and a second output $Z_2$ that are coupled to receiver 16. Output $Z_1$ and output $Z_2$ have a reduced amount of interference as reduced by CPIC 20.

CPIC 20 has an adjustable cancellation circuit 22 coupled to INPUT 1 and INPUT 2. A performance measurement circuit 24 is coupled to output signals $Z_1$ and $Z_2$. Performance measurement circuit 24 provides feedback to a controller 26. As will be further described below, adjustable cancellation circuit 22 has a plurality of adjustable complex weighting circuits that are coupled to INPUT 1 and INPUT 2. Controller 26 adjusts the weights based on the feedback from performance measurement circuit 24. As the input signals INPUT 1 and INPUT 2 are passed through adjustable cancellation circuit 22, the weights are added to the input signals and reduce the amount of noise on outputs $Z_1$ and $Z_2$.

Performance measurement circuit 24 and controller 26 provide adaptive feedback and control the value of the weights in the weighting circuit. Performance measurement circuit 24 measures the amount of residual interference in outputs $Z_1$ and $Z_2$. Controller 26 calculates new weights based on the amount of residual interference measured by performance measurement circuit 24. Preferably, the weights are continually updated to minimize the amount of interference at outputs $Z_1$ and $Z_2$.

Figure 3:
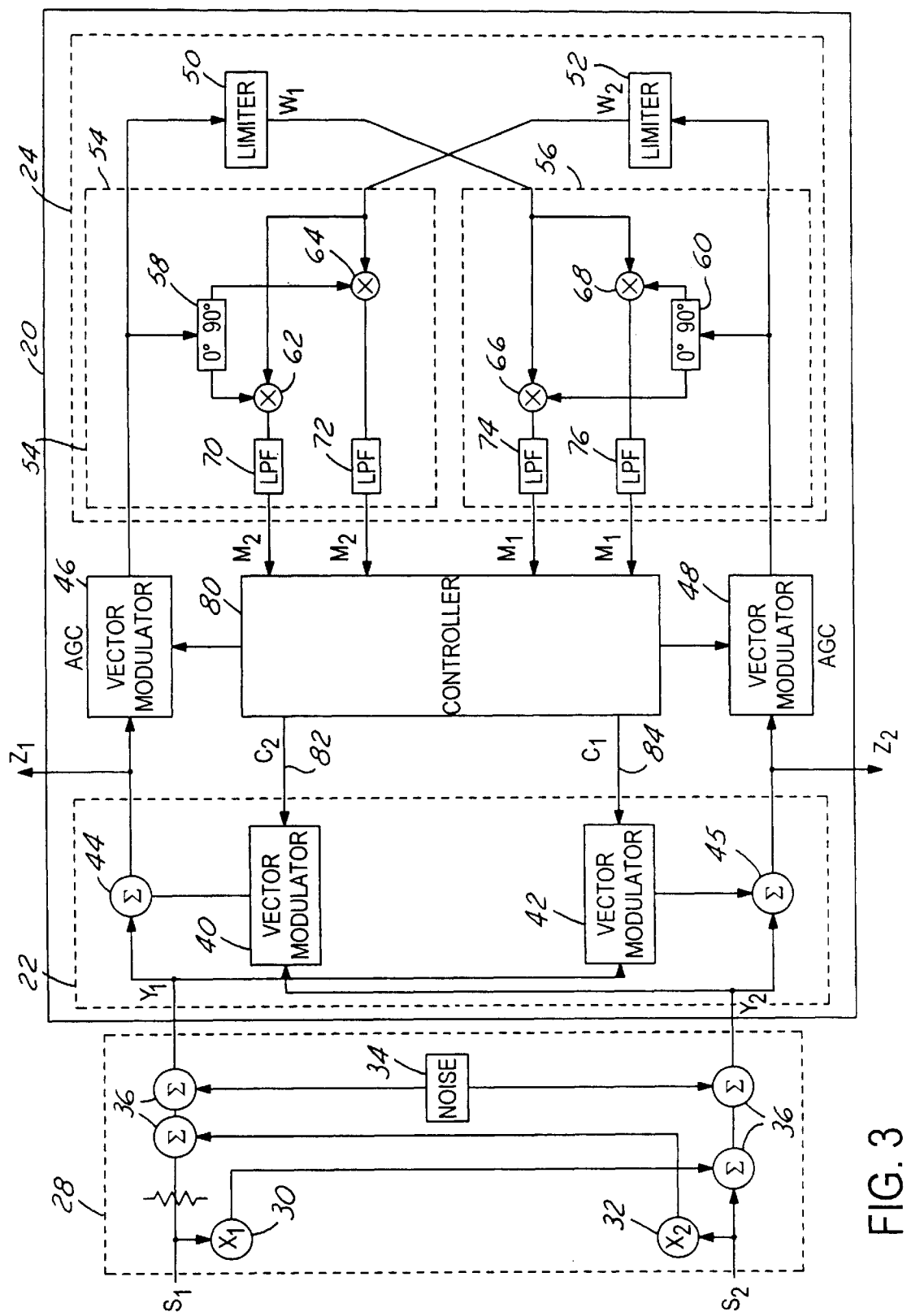
FIG. 3 is a functional block diagram of a single tap cross polarization interference canceller according to the present invention.

Referring now to FIG. 3, the atmospheric effects on transmitted signals $S_1$ and $S_2$ are generally represented by reference numeral 28. Cross polarization interference is represented by multipliers 30 and 32. Other types of noise are represented by box 34. Thus, the noise and cross polarization interference is added into signals $S_1$ and $S_2$ by addition blocks 36. $S_2$ has cross polarization interference signal represented by $(S_1)(X_1)$. $S_1$ has cross polarization interference signal $(S_2)(X_2)$. Thus, the first input to CPIC 20 is $Y_1$. The second input to CPIC 20 is represented by $Y_2$. Both $Y_1$ and $Y_2$ have interference components added thereto. Thus, $Y_1=S_1+X_2S_2$ and $Y_2=S_2+X_1S_1$, where $X_1$ and $X_2$ are complex numbers that represent cross polarization.

Input signals $Y_1$ and $Y_2$ are routed to adjustable cancellation circuit 22. Adjustable cancellation circuit 22 has a pair of inphase/quadrature vector modulators 40 and 42. Cancellation circuit 22 also has addition blocks 44 and 45. Addition blocks 44 and 45 are coupled to outputs $Z_1$ and $Z_2$ respectively.

Vector modulator 40 has an adjustable weight $C_2$. Vector modulator 42 has an adjustable weight $C_1$. Input signal $Y_2$ is multiplied by weight $C_2$ and is added to input $Y_1$ at addition block 44 to obtain output $Z_1$. Output $Z_1$ is, therefore, $Y_1+C_2 Y_2$. Likewise, output $Z_2=Y_2+C_1 Y_1$. Weights $C_1$ and $C_2$ are adjustable and are sized to eliminate or minimize interference from the other channel.

Performance measurement circuit 24 is coupled to outputs $Z_1$ and $Z_2$ through optional automatic gain controllers (AGC) 46 and 48. AGC 46 and 48 are also inphase/quadrature vector modulators similar to vector modulators 40 and 42 described above. AGCs 46 and 48 mitigate the effect of any DC biasing from any of the other components of the circuit. AGCs 46 and 48 are alternated between 0° and 180°. The signal is thus changed for various segments and the DC bias may be determined.

Performance measurement circuit 24 generally has a first limiter 50 and a second limiter 52. Performance measurement 24 also has a first correlator 54 and a second correlator 56. Limiters 50 and 52 are coupled to outputs $Z_1$ and $Z_2$ respectively. Limiters 50 and 52 are generally known in the art. The input to each of the two limiters is the sum of two independent signals, that is, the transmitted signals $S_1$ and $S_2$ and the interference signal. The transmitted signals $S_1$ and $S_2$ are much larger than the interference signal. Limiters 50 and 52 cause the smaller signal to be suppressed with respect to the larger. Thus, limiters 50 and 52 have an output $W_1$ and $W_2$ respectively.

The output $W_1$ is coupled to correlator 56. The output $W_2$ is coupled to correlator 54. Correlator 54 has a pair of outputs $M_2$ and $M_2'$. Correlator 56 has a pair of outputs $M_1$ and $M_1'$.

Correlators 54 and 56 may each have a phase mismatch corrector 58 and 60, respectively. The phase mismatch correctors 58 and 60 are optional features of the CPIC circuit.

Correlator 54 also has a first mixer 62 and a second mixer 64. Correlator 56 has a first mixer 66 and a second mixer 68. First correlator 54 also preferably has low pass filters 70 and 72. Correlator 56 preferably has low pass filters 74 and 76.

Limiter output $W_2$ is combined with (multiplied by) output signal $Z_1$ that has not passed through limiter $W_1$. The output $Z_1$ may be passed through phase mismatch corrector 58 which will be described below. The output signal from mixer 62 is filtered by low pass filter 70. Low pass filter 70 reduces DC biasing within the signal from mixer 62.

Mixer 64 also has an input from the output of limiter $W_2$ which is combined with output signal $Z_1$. The signal from mixer 64 is filtered by low pass filter 72 in a similar manner to that described above.

Mixers 66 and 68 combine output signal $Z_2$ with the output from limiter 50, $W_1$. The output from mixers 66 and 68 may be filtered in low pass filters 74 and 76.

The output signals from correlators 54 and 56, that is $M_2$, $M_2'$, $M_1$ and $M_1'$ are inputs to a controller 80. Each of the output signals provide an indication of noise level to controller 80. Controller 80 calculates weights $C_1$ and $C_2$ based on inputs from correlators 54 and 56. Controller 80 has a pair of outputs 82 and 84 which are coupled to vector modulators 40 and 42, respectively. Controller 80 by iteration reduces the interference in outputs signals $Z_1$ and $Z_2$ by iteratively changing the weights $C_2$ and $C_1$ through feedback through limiters 50 and 52 and correlators 54 and 56.

Some imaginary component may be associated with signals $Z_1$ and $Z_2$. Phase mismatch correctors 58 and 60 in combination with controller 80 allows a determination of the phase of output signal $Z_1$ and $Z_2$. Phase correctors 58 and 60 manipulate signals $Z_1$ and $Z_2$ so that signals $Z_1$ and $Z_2$ lie in a real axis. The underlying principle is that if the signals are more than 90° out of phase, CPIC 20 will cause the solution to diverge. Phase mismatch correctors ensure that the answer will converge to a reduced interference output signal. Phase mismatch correctors 58 and 60 have an output reference at zero degrees and a shifted output at 90 degrees out of phase with output $Z_2$. Controller 80 manipulates the outputs to determine the proper phase of the signal. The proper phase allows the solution to converge.

Phase mismatch correctors 58 and 60 are desirable but optional features, particularly if another method is used to monitor the phase of the output signals. If phase mismatch correctors 58 and 60 are eliminated, one mixer and low pass filter can be eliminated for each output signal.

Automatic gain controllers 46 and 48 also use weights calculated by controller 80. The weights in AGCs 46 and 48 are adjusted so that a proper signal level to mixers 62, 64, 66, and 68 are maintained. AGCs 46 and 48 also limit the output signal $Z_1$ to a dynamic range that is less than the saturation limit of limiter 50 and 52. By changing the weights in AGC 46 and 48, the signals can be mathematically manipulated to be in the proper range.

In operation of FIG. 3, the system is designed to remain constantly operating. CPIC 20 adaptively changes the weights $C_1$ and $C_2$ to reduce interference in output signal $Z_1$ and $Z_2$ caused by rain or other atmospheric conditions. Feedback is provided to controller 80 by limiters 50 and 52 and correlators 54 and 56. The mixing of the signal output of limiter 50, $W_1$, and the output signal $Z_2$ allows controller 80 to provide an indication as to the amount of cross polarization from the first channel that is cross polarized and interfering with the output of the second channel. Because the amount of interference and the signals vary, the process is an iterative process, which continuously updates weights $C_1$ and $C_2$.

The system as shown in FIG. 3 is a single tap CPIC. That is, only one sample of input signal $Y_1$ and one sample of input $Y_2$ are compared in performance measurement circuit 24. A single tap implementation assumes that cross polarization interference is s constant versus frequency. The single tap implementation is capable of removing average cross polarization interference across the frequency band. As mentioned above, cross polarization may not be constant over a frequency band.

Figure 4:
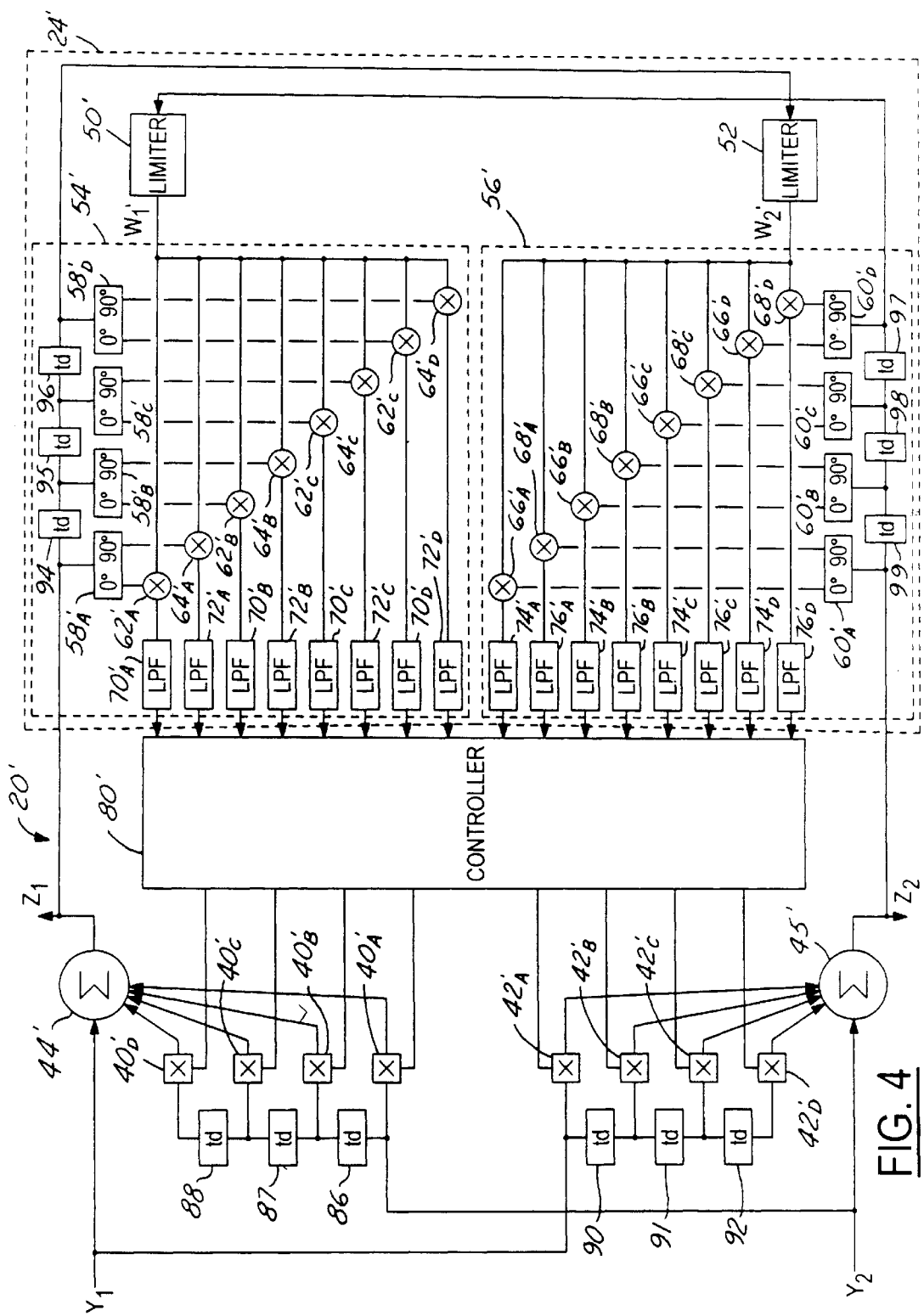
FIG. 4 is a functional block diagram of a multiple tap cross polarization interference canceller according to a second embodiment of the invention.

Referring now to FIG. 4, a cross polarization interference coupler 20' that is capable of removing frequency dependent cross polarization interference is shown. FIG. 4 is a multi-tap configuration. The implementation in FIG. 4 is operationally similar to that described above with respect to FIG. 3. Therefore, the description will be limited to only those features that have been modified from FIG. 3. Generally, the operational differences between FIG. 3 and FIG. 4 is that FIG. 4 simultaneously processes four portions of input signal $Y_1$ and four portions of input signal $Y_2$.

Input signal $Y_2$ has three time delay blocks 86, 87 and 88 that are used to obtain sequential portions of input signal $Y_2$. Each of the three time delayed portions and the undelayed portion are multiplied by the weights contained in one of four respective vector modulators represented as 40' A, 40' B, 40' C, and 40'D. Each of these signals is then combined in addition block 44'. Likewise, input signal $Y_1$ is divided by the time delay blocks 90, 91 and 92 so that four sequential portions of input signal $Y_1$ is obtained; three delayed, one undelayed. The time delayed $Y_1$ signal is processed through vector modulator 42' A, 42' B, 42' C, and 42' D, and is summed in addition block 45'. The recombined signals after addition block 44' and 45' are the output signals $Z_1$ and $Z_2$, respectively.

Performance measurement circuit 24' is coupled to output $Z_1$ and $Z_2$. Correlator 54 contains time delays 94, 95 and 96 so that sequential portions of the signals may be individually processed. Correlator 56' has time delays 97, 98 and 99. In a similar manner to that described in FIG. 3, a limited output signal $Z_2$ limited by limiter 50' outputs a signal $W_1'$ which is combined with the various portions of output signal $Z_1$.

Likewise, limiter 52' generates an output signal $W_2'$ which is combined with the output signal $Z_2$. Like that described above, output signal $Z_2$ may be processed through phase mismatch correctors 60' A through 60' D.

Each time delayed portion of output signal $Z_1$ and $Z_2$ may be processed through phase mismatch corrector 58' A through 58' D and 60' A through 60' D, respectively. Mixers 62', 64', 66' and 68' combine the signals from limiters 50' and 52'.

In a similar manner to that described above, low pass filters 70' A through D, 72' A through D, 74' A through D, and 76' A through D may filter the output of mixers 62' A through D, 64' A through D, 66' A through D, and 68' A through D to reduce D.C. biasing. Thus, controller 80' has 16 inputs corresponding to the two sets of four signal sample portions of each input signal.

An AGC may also be used to further process the output signals $Z_1$ and $Z_2$. AGC is not shown in FIG. 4 for simplicity.

In operation, because four portions of each of the signal are simultaneously processed, removing frequency dependent cross polarization interference is possible. The signals are essentially processed in the same manner as that described above with reference to FIG. 3, with the exception of each of the input signals has four portions that are simultaneously.

While the best mode for carrying out the present invention has been described in detail, those familiar with the art to which this invention relates will recognize various alternative designs and embodiments for practicing the invention as defined by the following claims:

What is claimed is:

1. A circuit for canceling cross polarization interference between a first input signal and a second input signal comprising:

an adjustable cancellation circuit having a first input for receiving the first input signal and a second input for receiving the second input signal, said adjustable cancellation circuit having a first programmable vector modulator having a first weight and a second programmable vector modulator having a second weight, said adjustable cancellation circuit generating a first output signal and a second output signal, said first output signal is a correlation of said first input signal with said first weight, said second output signal is an correlation of said second input signal and said second weight;

a performance measurement circuit receiving said first output signal and said second output signal said performance measurement circuit generating a first correlated signal and a second correlated signal corresponding to interference from said first output signal and said second output signal; and a controller having controller input coupled to said performance measurement circuit and controller outputs coupled to said adjustable cancellation circuit, said controller adaptively changing said first weight and said second weight in response a detected amount of cross polarization detected.

2. A circuit as recited in claim 1 wherein said first input is right hand circularly polarized.

3. A circuit as recited in claim 1 wherein said second input is left hand circularly polarized.

4. A circuit as recited in claim 1 wherein said performance measurement circuit further comprises a phase mismatch detection circuit, said phase mismatch detection circuit manipulating said signal to be within 90 degrees of said first output signal and said second output signal to compensate a phase mismatch.

5. A circuit as recited in claim 1 further comprising a first plurality of time delays coupled to a first plurality of vector modulators, and a second plurality of time delays coupled to a second set of vector modulators.

6. A circuit as recited in claim 1 further comprising a third plurality of time delays coupled to said output signal and a fourth plurality of time delays coupled to said output signal set.

7. A circuit as recited in claim 1 further comprising an addition block for summing said signal from said vector modulators.

8. A circuit as recited in claim 1 further comprising a plurality of low pass filters.

9. A circuit as recited in claim 1 further comprising an automatic gain control circuit coupled to said performance measurement circuit, said automatic gain control circuit controlling a saturation limit to said limiters.

10. A method for canceling for cross polarization between a first channel and a second channel of a satellite communication comprising the steps of:

receiving a first input signal from a first channel;

receiving a second input signal from a second channel;

generating a first output signal by correlating said first input signal with a first weight;

generating a second output signal by correlating said second input signal with a second weight;

generating a first limited signal from said first output signal;

generating a second limited signal from said second output signal;

generating a first correlated signal indicative of interference of said first input signal on the second signal from the first limited signal;

generating a second correlated signal indicative of interference of said second input signal on the first signal from the second limited signal; and adaptively changing said first weight and said second weight in response to said first correlated signal and said second correlated signal corresponding to an amount of cross polarization detected.

11. A method as recited in claim 10 wherein said first input is right hand circularly polarized.

12. A method as recited in claim 10 wherein said second input is left hand circularly polarized.

13. A method as recited in claim 10 further comprising the step of compensating said first output signal and second output signal for DC biasing.

14. A method as recited in claim 13 wherein said step of compensating the first output signal and second output signal for DC biasing comprises low-pass filtering said first signal and said second signal.

15. A method as recited in claim 10 further comprising the step of canceling said first output signal and said second output signal for phase mismatch.

16. A method as recited in claim 15 wherein said step of canceling said first output signal and said second output signal for phase mismatch comprises the step of directing a 90° out of phase signal to a controller.

17. A method for canceling for cross polarization between a first channel and a second channel of a satellite communication comprising the steps of:

receiving a first input signal from a first channel;

receiving a second input signal from a second channel;

dividing the first input signal into a plurality of first signal portions;

dividing the second input signal into a plurality of second signal portion;

generating a first output signal by correlating the plurality of first input signal portions with a plurality of first weights corresponding to the plurality of first signal portions;

generating a second output signal by correlating the plurality of second input signal portions with a plurality of second weights corresponding to the plurality of respective second signal portions;

generating a first limited signal from the first output signal;

generating a second limited signal from the second output signal;

generating a plurality of first correlated signals indicative of interference of the first input signal on the plurality of second signal portions from the first limited signal;

generating a plurality of second correlated signals indicative of interference of the second input signal on the plurality of first signal portions from the second limited signal; and adaptively changing the plurality of first weights and the plurality of second weights in response to the plurality of first correlated signals and the plurality of second correlated signals corresponding to an amount of cross polarization detected.

18. A method as recited in claim 17 further comprising the step of further comprising the step of canceling the first output signal and said second output signal for phase mismatch.

19. A method as recited in claim 18 wherein said step of canceling the first output signal and the second output signal for phase mismatch comprises the step of directing a 90° out of phase signal to a controller.

20. A method as recited in claim 17 further comprising the step of compensating the first input signal and the second input signal for DC biasing.

* * * * *